US011625343B2

(12) United States Patent
Ayyapureddi

(10) Patent No.: US 11,625,343 B2
(45) Date of Patent: Apr. 11, 2023

(54) MEMORY WITH A COMMUNICATIONS BUS FOR DEVICE-TO-CONTROLLER COMMUNICATION, AND ASSOCIATED SYSTEMS, DEVICES, AND METHODS

(71) Applicant: Micron Technology, Inc., Boise, ID (US)

(72) Inventor: Sujeet Ayyapureddi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/318,219

(22) Filed: May 12, 2021

(65) Prior Publication Data

US 2022/0365889 A1  Nov. 17, 2022

(51) Int. Cl.
  *G06F 13/16* (2006.01)
  *G06F 13/42* (2006.01)
  *G06F 13/28* (2006.01)
  *G06F 13/40* (2006.01)

(52) U.S. Cl.
  CPC ...... *G06F 13/1668* (2013.01); *G06F 13/1636* (2013.01); *G06F 13/28* (2013.01); *G06F 13/405* (2013.01); *G06F 13/4234* (2013.01)

(58) Field of Classification Search
  None
  See application file for complete search history.

(56) References Cited

U.S. PATENT DOCUMENTS

| | | | | |
|---|---|---|---|---|
| 6,401,186 B1* | 6/2002 | Blodgett | ............. | G06F 12/0215 711/213 |
| 7,636,833 B2* | 12/2009 | Tremaine | ................ | G06F 12/10 711/208 |
| 8,818,867 B2* | 8/2014 | Baldwin | ............. | G06Q 20/353 705/16 |
| 9,740,269 B1* | 8/2017 | Tatapudi | .................. | G11C 8/10 |

(Continued)

OTHER PUBLICATIONS

Rajinder Gill, Everything You Always Wanted to Know About SDRAM (Memory): But Were Afraid To Ask, AnandTech.com, Aug. 15, 2010, 17 pages.

(Continued)

*Primary Examiner* — Michael Sun
(74) *Attorney, Agent, or Firm* — Perkins Coie LLP

(57) ABSTRACT

Memory systems with a communications bus (and associated systems, devices, and methods) are disclosed herein. In one embodiment, a memory device includes an input/output terminal separate from data terminals of the memory device. The input/output terminal can be operably connected to a memory controller via a communications bus. The memory device can be configured to initiate a communication with the memory controller by outputting a signal via the input/output terminal and/or over the communications bus. The memory device can be configured to output the signal in accordance with a clock signal that is different from a second clock signal used to output or receive data signals via the data terminals. In some embodiments, the memory device is configured to initiate communications over the communica- (Continued)

tion bus only when it possesses a communication token. The communication token can be transferred between memory devices operably connected to the communications bus.

20 Claims, 4 Drawing Sheets

(56) References Cited

U.S. PATENT DOCUMENTS

| | | | |
|---|---|---|---|
| 2009/0210942 A1* | 8/2009 | Abel | G06F 21/77 |
| | | | 726/20 |
| 2014/0089576 A1 | 3/2014 | Bains et al. | |
| 2017/0255383 A1 | 9/2017 | Chang et al. | |
| 2018/0225230 A1* | 8/2018 | Litichever | G06F 13/107 |

OTHER PUBLICATIONS

U.S. Appl. No. 17/327,530—Unpublished Patent Application to Ayyapureddi, filed May 21, 2021, titled "Memory With Memory-Initiated Command Insertion, and Associated Systems, Devices, and Methods", 39 pages.

* cited by examiner

MEMORY WITH A COMMUNICATIONS BUS FOR DEVICE-TO-CONTROLLER COMMUNICATION, AND ASSOCIATED SYSTEMS, DEVICES, AND METHODS

TECHNICAL FIELD

The present disclosure is related to memory systems, devices, and methods. In particular, the present disclosure is related to memory devices having a communication bus for memory device-to-memory controller communication, and associated systems, devices, and methods.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including static random access memory (SRAM), dynamic random access memory (DRAM), and synchronous dynamic random access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random access memory (FeRAM), resistive random access memory (RRAM), and magnetic random access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

Figure 1A:
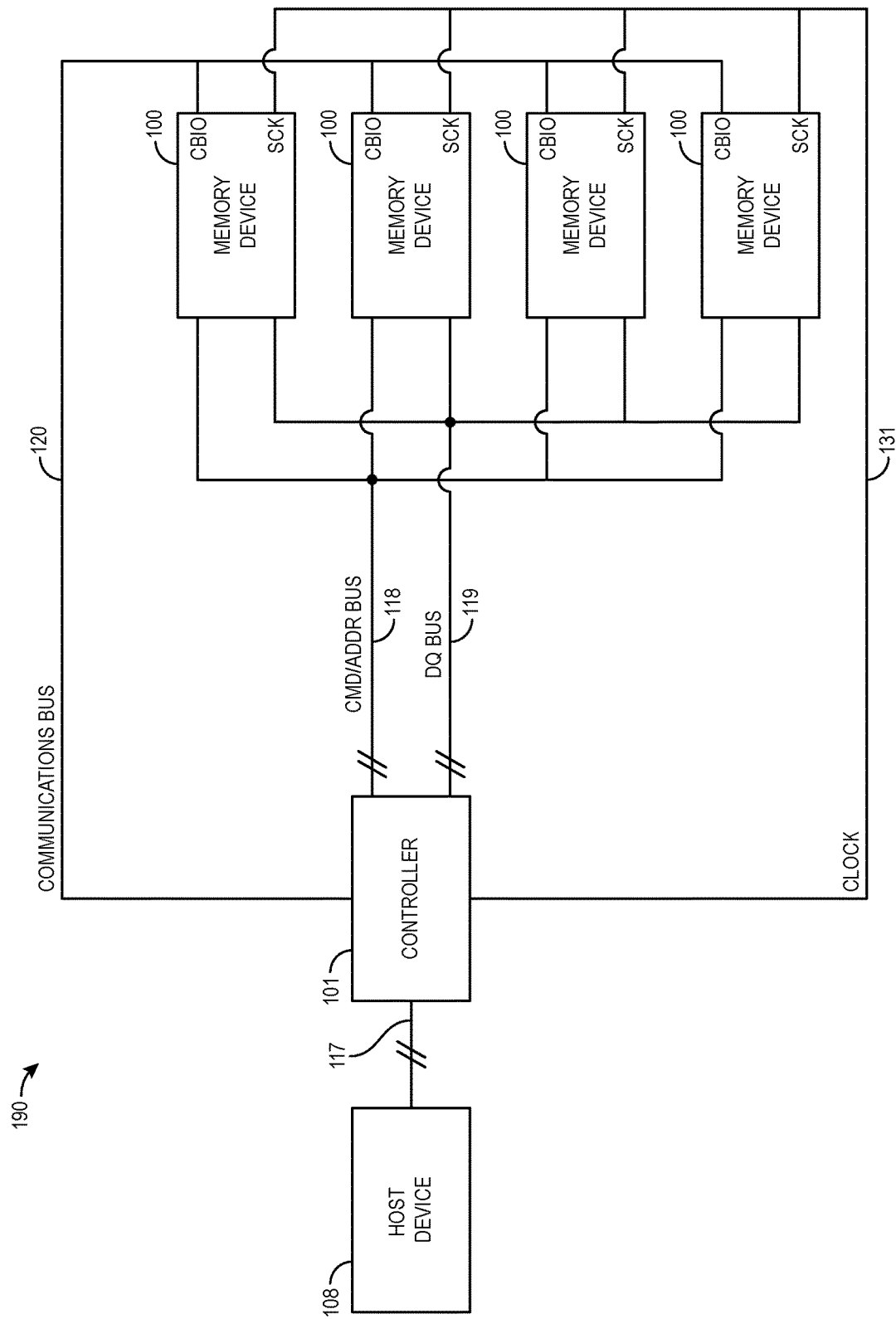
FIG. 1A is a block diagram schematically illustrating a memory system configured in accordance with various embodiments of the present technology.

As discussed in greater detail below, the technology disclosed herein relates to memory systems having a communications bus operably connecting a memory controller to one or more memory devices. The communications bus can be separate and/or different from a command/address bus and/or a data bus included in many memory systems. For example, the communications bus can be provided in addition to the command/address bus and the data bus. Unlike the command/address bus and/or the data bus, the communications bus can facilitate a memory device (i) initiating communications with the memory controller and/or (ii) communicating bulk information (e.g., reliability information, refresh information, etc.) to the memory controller. Communications transmitted over the communications bus can be governed by a communications protocol (such as a token-based communications protocol) and/or can be transmitted in accordance with a clock signal separate and/or different from the clock signal(s) used for communications over the command/address bus and/or the data bus. In some embodiments, communication over the communications bus can be performed as one or more background operations of the memory device. A person skilled in the art will understand that the technology may have additional embodiments and that the technology may be practiced without several of the details of the embodiments described below with reference to FIGS. 1A-3.

In the illustrated embodiments below, the memory devices and systems are primarily described in the context of devices incorporating DRAM storage media. Memory devices configured in accordance with other embodiments of the present technology, however, can include other types of memory devices and systems incorporating other types of storage media, including PCM, SRAM, FRAM, RRAM, MRAM, read only memory (ROM), erasable programmable ROM (EPROM), electrically erasable programmable ROM (EEROM), ferroelectric, magnetoresistive, and other storage media, including non-volatile, flash (e.g., NAND and/or NOR) storage media.

A. Overview

Many memory systems include a controller- or processor-centric architecture, meaning that a controller or processor initiates communications between the controller/processor and one or more memory devices operably connected to the controller/processor. For example, in many memory systems, a memory controller issues commands to a memory device over a command/address bus. Continuing with this example, in the event a command issued from the memory controller to the memory device is an access command that instructs the memory device to output data from the memory device to the memory controller, the memory device responds to the command by (i) accessing data stored in memory cells corresponding to a memory address received from the memory controller over the command/address bus and (ii) outputting the data to the memory controller over a data bus. Similarly, in the event a command issued from the memory controller to the memory device is an access command that instructs the memory device to write data to its memory array, the memory device responds to the command by (i) receiving data from the memory controller over the data bus and (ii) writing the data to memory cells corresponding to a memory address received from the memory controller over the command/address bus. Thus, the memory device is mostly responsive to communications it receives from the memory controller over the command/address bus. In other words, the command/address bus can be used primarily by the memory controller to initiate communications with the memory device. Stated another way, the ability for the memory device to initiate communications with the memory controller via the command/address bus can be limited.

In some memory systems, the memory device can communicate with the memory controller, but the communication is limited. For example, a memory device can program mode registers to communicate information to the memory controller. The memory controller can then read the information from the programmed mode registers. To read the programmed mode registers, however, the memory controller requires all lines of the command/address bus and the data bus to be idle until the memory controller is able to read the mode registers and determine how to respond to the communication. Because the command/address bus and the data bus must be idle for the memory controller to read the mode registers utilizes, communication via the mode registers expends a large amount of valuable system bandwidth by tying up these buses until the memory controller finishes reading the mode registers and determining how to respond to the communication. As such, bulk information (e.g., information related to more than one memory row or memory region of the memory device) cannot be communicated via the mode registers without a significant impact on system bandwidth. As another example, some memory devices include an alert pin that can be used to communicate with a memory controller. The alert pin is function specific, however, and is most often used to signal the memory controller merely that a certain condition (e.g., a cyclic redundancy check (CRC) error) has occurred.

Furthermore, some memory systems include a module of memory devices operably connected to a memory controller. In these memory systems, the memory controller transmits commands, addresses, and data over the command/address bus and/or the data bus to each of the memory devices of the module at once. The memory controller additionally transmits one or more device select signals to identify which memory device of the module is to respond to the commands, addresses, and data. In other words, the manner in which the memory controller is operably connected to each of the memory devices via the command/address bus and the data bus does not facilitate communicating with only one memory device without use of a separate device select signal and/or without entering or using a specialized operating mode (e.g., a per DRAM addressability (PDA) mode).

To address these concerns, memory systems configured in accordance with the present technology can include a communications bus operably connecting the memory controller to one or more memory devices. The communications bus can be separate and/or different from the command/address and/or data busses discussed above. For example, the communications bus can be provided in addition to the command/address bus and/or the data bus discussed above.

The communications bus can facilitate an individual memory device initiating communications with the memory controller and/or with another memory device operably connected to the communications bus. Communication over the communications bus can be governed by a communications protocol. The protocol can be separate and/or different from the communications protocol used for the command/address bus and/or the data bus. For example, the communications protocol can be a token-based communications protocol in which devices (e.g., the memory devices, or the memory devices and the memory controller) operably connected to the communications bus transfer the token (e.g., in a round-robin or other fashion) amongst themselves. The device that currently possesses the token can control communications transmitted over the communications bus. Thus, a memory device can communicate with the memory controller (and/or one or more other memory devices of the memory system) while it possesses the token and on an individual basis.

In some embodiments, communications can be transmitted over the communications bus in accordance with one or more clock signals. For example, a clock signal can be superimposed over data included in a communication sent over the communications bus. Devices that receive the communication can use clock recovery circuits to recover the clock signal and the data from the communication. As another example, memory systems of the present technology can include one or more clock traces in addition to the clock traces commonly provided in many memory systems. The memory controller and/or a memory device (e.g., a dedicated device, the device currently possessing the token, etc.) can use the additional clock trace(s) to drive a clock signal to the other devices of the memory system, which the other devices can use for communications transmitted over the communications bus.

The memory devices and/or the memory controller can use the communications bus to transfer various types of data to any of the devices operably connected to the communications bus. For example, a memory device can transfer reliability information (e.g., error check and scrub (ECS) data, row hammer refresh (RHR) data, refresh counter order data, etc.) or other information (e.g., user data, error type information, etc.) to the memory controller over the communications bus. Because the communications bus is separate from the command/address bus and the data bus discussed above, communications transmitted over the communications bus do not tie up the command/address bus or the data bus. Furthermore, in some embodiments, communications can be transmitted over the communications bus as background operations. Thus, continuing with the above example, the memory device can transfer reliability or other information to the memory controller in bulk (e.g., information relating to all or a subset of the memory rows of the memory array) and/or without significantly reducing system bandwidth.

Transmission of bulk information over the communications bus can facilitate implementing changes in other memory device operations. For example, rather than a memory device transmitting ECS data to the memory controller that includes only the address of a memory row with a highest number of fails for that memory device and/or how many times that memory row has been serviced, the communications bus can enable the memory device to communicate ECS data to the memory controller for all or a larger subset of the memory rows of the memory device. This can provide greater insight into the reliability of a memory region of the memory device and can aid the memory system in determining whether to service or retire memory rows of the memory region.

As another example, rather than using statistical sampling techniques to identify potential victim memory rows for RHR operations (as is commonly done in many memory systems), the communications bus can facilitate implementing a deterministic RHR solution in which a memory device tracks the number of times each memory row of the memory device is activated. All or a portion of this count information can be communicated to the memory controller via the communications bus to identify victim memory rows for RHR operations. Additionally, or alternatively, the memory device can compare the activation counts for each memory row to a threshold, and can perform RHR operations on memory rows neighboring a memory row whose count has met or exceeded the threshold. As part of this procedure, the memory device can communicate to the memory controller (via the communications bus) an amount of time during which the memory device will be unavailable to the memory controller such that the memory device can perform RHR operations to service the neighboring memory rows. The amount of time communicated can be dependent on the number of rows that need servicing. Such a deterministic RHR solution can prevent the memory device from becoming overwhelmed when a significant number of memory rows of the memory device are repeatedly activated (e.g., via the actions of a malicious actor) to corrupt data stored in the memory array of the memory device and/or to trigger RHR operations across a large portion of the memory array at the same time.

Furthermore, by providing a memory system architecture that is not controller-centric or is not primarily controller-centric, memory systems configured in accordance with the present technology meet industry shifts towards technologies and protocols (e.g., compute express link (CXL), high bandwidth memory third generation (HBM3), D6 discovery, etc.) that improve communications between a memory device and a memory controller and/or that are less controller-centric. Additionally, or alternatively, data transmitted from a memory device to a memory controller over a communications bus of the present technology can be subsequently relayed to a host device and/or another device operably connected to the memory controller. Thus, memory systems of the present technology can help meet industry demand (e.g., by cloud and automotive companies) for greater telemetry opportunities into memory devices (e.g., DRAM memory devices).

B. Selected Embodiments of Memory Systems and Associated Devices and Methods FIG. 1A is a block diagram schematically illustrating a memory system 190 configured in accordance with various embodiments of the present technology. In one embodiment, the memory system 190 is a dual in-line memory module (DIMM). In these and other embodiments, a single module or rank of memory devices 100 is illustrated in FIG. 1A. Well-known components of the memory system 190 have been omitted from FIG. 1A and are not described in detail below so as to avoid unnecessarily obscuring aspects of the present technology.

As shown in FIG. 1A, the memory system 190 can include one or more memory devices 100 that can be connected to an electronic device that is capable of utilizing memory for the temporary or persistent storage of information, or a component thereof. For example, the memory devices 100 can be operably connected to a host device 108 and/or to a memory controller 101. The host device 108 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 108 may be a networking device (e.g., a switch, a router, etc.); a recorder of digital images, audio, and/or video; a vehicle; an appliance; a toy; or any one of a number of other products. In one embodiment, the host device 108 may be connected directly to the memory device 100 (e.g., via a communications bus of signal traces (not shown)). Additionally, or alternatively, the host device 108 may be indirectly connected to the memory device 100 (e.g., over a networked connection or through intermediary devices, such as through the memory controller 101 and/or via a communications bus 117 of signal traces).

The memory devices 100 of the memory system 190 are operably connected to the memory controller 101 via a command/address (CMD/ADDR) bus 118 and a data (DQ) bus 119. As described in greater detail below with respect to FIG. 1B, the CMD/ADDR bus 118 and the DQ bus 119 can be used by the memory controller 101 to communicate commands, memory addresses, and/or data to the memory devices 100. In response, the memory devices 100 can execute commands received from the memory controller 101. For example, in the event a write command is received from the memory controller 101 over the CMD/ADDR bus 118, the memory devices 100 can receive data from the memory controller 101 over the DQ bus 118 and can write the data to memory cells corresponding to memory addresses received from the memory controller 101 over the CMD/ADDR bus 118. As another example, in the event a read command is received from the memory controller 101 over the CMD/ADDR bus 118, the memory devices 100 can output data to the memory controller 101 over the DQ bus 118 from memory cells corresponding to memory addresses received from the memory controller 101 over the CMD/ADDR bus 118.

In the embodiment illustrated in FIG. 1A, the memory devices 100 are further operably connected to the memory controller 101 via a communications bus 120 of one or more signal traces. The communications bus 120 is separate and/or different from the CMD/ADDR bus 118 and/or the DQ bus 119. In some embodiments, the communications bus 120 can be provided in addition to or in lieu the CMD/ADDR bus 118 and/or the DQ bus 119. Additionally, or alternatively, a separate and/or different communications protocol can be used to govern communications over the communications bus 120 than used to govern communications over the CMD/ADDR bus 118 and/or the DQ bus 119. In these and other embodiments, the communications bus 120 can be independent of and/or not included within Joint Electron Device Engineering Council (JEDEC) specification standards.

The communications bus 120 of FIG. 1A is operably connected to one or more (e.g., serial) input/output CBIO pins of the memory devices 100. In some embodiments, the communications bus 120 is a shared communications bus. For example, the communications bus 120 can include one or more common signal traces that are used by each of the memory devices 100 to send and receive data (e.g., to/from the memory controller 101 and/or to/from another of the memory devices 100). In other embodiments, the communications bus 120 can include one or more signal traces dedicated to one of the memory devices 100 or dedicated to a subset of the memory devices 100 such that only the one memory device 100 or only memory devices 100 of the subset can use the dedicated signal traces to send/receive communication (e.g., to/from the memory controller 101).

As described in greater detail below with respect to FIG. 2, a memory device 100 can utilize the communications bus 120 to initiate communication with the memory controller 101 and/or with another of the memory devices 100. In these and other embodiments, the memory controller 101 can utilize the communications bus 120 to initiate communication with an individual memory device 100. Various communication protocols can be implemented to govern communications between memory devices 100 and/or between a memory device 100 and the memory controller 101. One such protocol is a token-based communications protocol (discussed in greater detail below) in which (i) a token is transferred (e.g., passed) between the memory devices 100 and/or between the memory devices 100 and the memory controller 101 and (ii) whichever device currently possess the token controls communications transmitted over the communications bus 120.

Communication over the communications bus 120 can run in accordance with a separate and/or different clock or clock frequency from the clock or clock frequency used for communication over the CMD/ADDR bus 118 and/or over the DQ bus 119. For example, communication over the CMD/ADDR bus 118 and/or over the DQ bus 119 can run in accordance with a clock period of approximately 200 picoseconds. Continuing with this example, communication over the communications bus 120 can run in accordance with a clock period of approximately 1-2 nanoseconds. Thus, in this example, the clock period used for communications over the communications bus 120 can be much larger than the clock period used for communications over the CMD/ADDR bus 118 and/or over the DQ bus 119. The slower clock signal used for the communications bus 120 can provide larger timing margins for communications. In these and other embodiments, an even slower clock signal (e.g., a clock signal having a period of approximately 5 nanoseconds) can be used to transfer a token or control over communications on the communications bus 120 between memory devices 100 and/or between memory devices 100 and the memory controller 101.

In some embodiments, the memory controller 101 and/or the memory devices 100 can include clock recovery circuits (not shown). In these embodiments, the memory controller 101 and/or the memory devices 100 can superimpose a clock signal onto data transmitted over the communications bus 120. When the frequency of the clock signal is known or agreed upon by the memory controller 101 and/or the memory devices 100, the memory controller 101 and/or the memory devices 100 can use the clock recovery circuits to recover the data and the clock signal from signals they receive over the communications bus 120. In these embodiments, the memory system 190 does not require additional clock traces and/or clock terminals for the clock signal.

In these and other embodiments, the memory system 190 can include one or more clock traces 131 operably connecting one or more external clock terminals of the memory devices 100 to the memory controller. The clock trace(s) 131 of the memory system 190 can be separate from and provided in addition to clock traces (not shown) commonly included in memory systems to govern communications transmitted over the CMD/ADDR bus 118 and/or the DQ bus 119. One or more clock signal(s) SCK transmitted over the clock trace(s) 131 can be used to govern the timing of communications transmitted over the communications bus 120. In some embodiments, the clock signal(s) SCK transmitted over the clock trace(s) 131 can be driven by the memory controller 101. In other embodiments, the clock signal(s) SCK transmitted over the clock trace(s) 131 can be driven by one of the memory devices 100, such as a memory device 100 that currently possesses a token and/or currently controls communications sent over the communication bus 120.

Figure 1B:
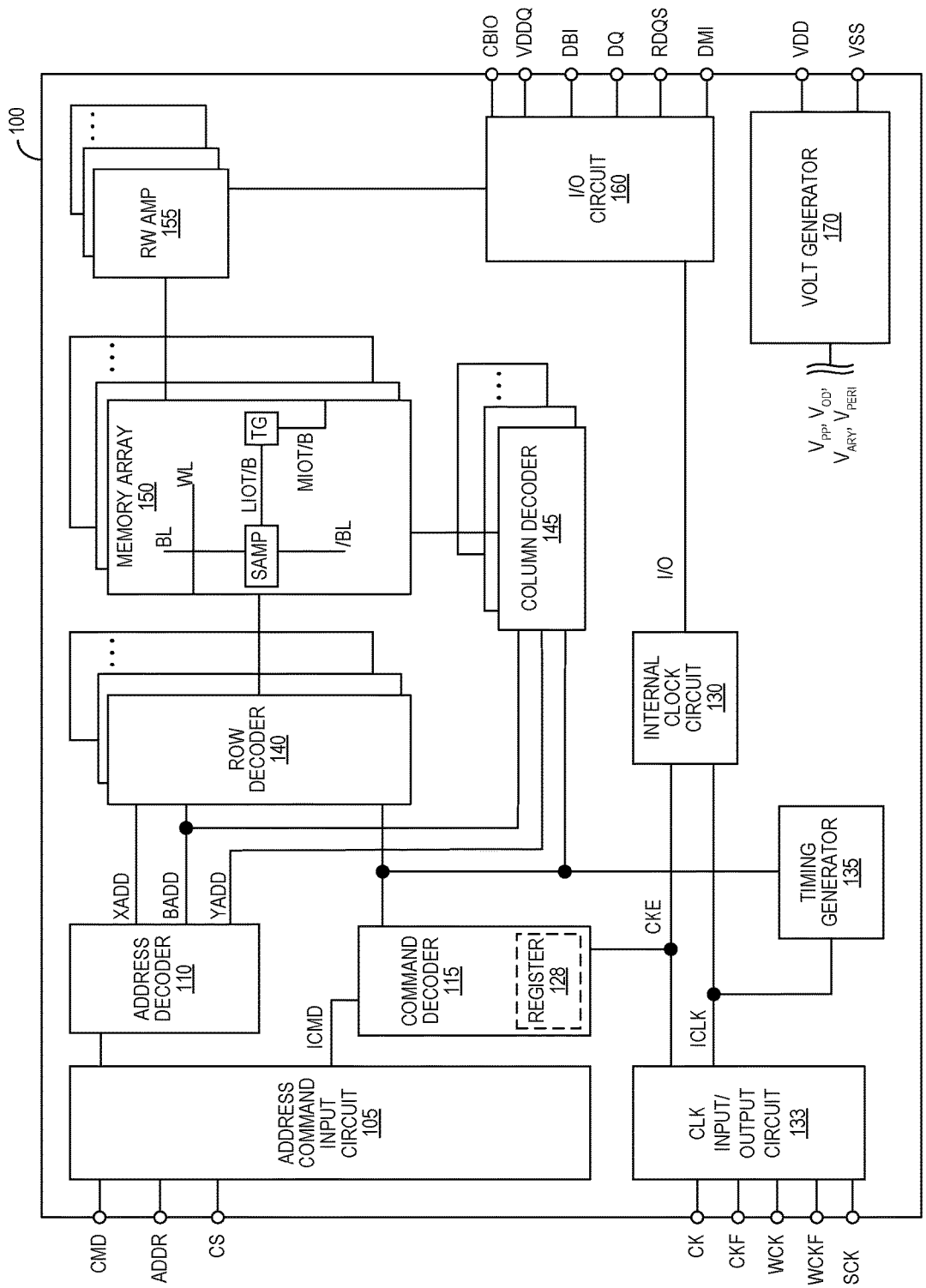
FIG. 1B is a block diagram schematically illustrating a memory device configured in accordance with various embodiments of the present technology.

FIG. 1B is a block diagram of a memory device 100 of FIG. 1A and configured in accordance with various embodiments of the present technology. As shown, the memory device 100 may employ a plurality of external terminals. The external terminals can include command and address terminals operably connected to the CMD/ADDR bus 118 (FIG. 1A) to receive command signals CMD and address signals ADDR, respectively. The external terminals may further include a chip select terminal to receive a chip select signal CS, clock terminals to receive clock signals CK and CKF, data clock terminals to receive data clock signals WCK and WCKF, data terminals DQ, RDQS, DBI, and DMI (e.g., operably connected to the DQ bus 119 of FIG. 1A), and power supply terminals VDD, VSS, and VDDQ. The memory device 100 further includes one or more input/output (I/O) terminals CBIO operably connected to the communications bus 120 (FIG. 1A) to send and/or receive data over the communications bus 120. For example, the memory device 100 can include a single I/O terminal CBIO in embodiments in which the communications bus 120 includes a single signal trace for use by the memory device 100. As another example, the memory device 100 can include multiple I/O terminals CBIO in embodiments in which the communications bus 120 includes multiple signal traces for use by the memory device 100. Additionally, in embodiments in which the memory system 190 of FIG. 1A includes one or more additional clock traces 131 to govern communication over the communications bus 120, the memory device 100 can further include one or more additional clock terminals to receive one or more clock signals SCK. In embodiments in which the memory system 190 of FIG. 1A does not include the one or more additional clock traces 131, the memory device 100 can lack the one or more additional clock terminals.

The power supply terminals of the memory device 100 may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in a row decoder 140, the internal potentials $V_{OD}$ and $V_{ARY}$ can be used in sense amplifiers included in a memory array 150 of the memory device 100, and the internal potential $V_{PERI}$ can be used in many other circuit blocks.

The power supply terminals may also be supplied with power supply potential $V_{DDQ}$. The power supply potential $V_{DDQ}$ can be supplied to an input/output (I/O) circuit 160 together with the power supply potential $V_{SS}$. The power supply potential $V_{DDQ}$ can be the same potential as the power supply potential $V_{DD}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the I/O circuit 160 so that power supply noise generated by the I/O circuit 160 does not propagate to the other circuit blocks.

The clock terminals, data clock terminals, and/or the additional clock terminal(s) may be supplied with external clock signals and/or complementary external clock signals. The external clock signals CK, CKF, WCK, WCKF, and/or SCK can be supplied to a clock input/output circuit 133. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input/output circuit 133 can receive the external clock signals. For example, when enabled by a CKE signal from a command decoder 115, an input buffer can receive the CK and CKF signals, the WCK and WCKF signals, and/or the SCK signal. The clock input/output circuit 133 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable signal CKE from the command decoder 115. For example, the internal clock circuit 130 can include a clock path (not shown in FIG. 1B) that receives the internal clock signal ICLK and provides various clock signals (not shown) to the command decoder 115. The internal clock circuit 130 can further provide input/output (I/O) clock signals. The I/O clock signals can be supplied to the I/O circuit 160 and can be used as timing signals to, for example, determine an output timing and/or an input timing of data transmitted over the data DQ bus 119 (FIG. 1A) and/or over the communications bus 120 (FIG. 1A). The I/O clock signals can be provided at multiple clock frequencies so that data can be output from and input into the memory device 100 at different data rates. A higher clock frequency may be desirable when high memory speed is desired. A lower clock frequency may be desirable when lower power consumption and/or looser timing margins are desired. The internal clock signals ICLK can also be supplied to a timing generator 135 and thus various internal clock signals can be generated that can be used by the command decoder 115, the column decoder 145, the I/O circuit 160, and/or other components of the memory device 100.

In embodiments in which data transmitted over the communication bus 120 of FIG. 1A is superimposed with a clock signal, the clock input/output circuit 133, the internal clock circuit 130, and/or the I/O circuit 160 can include clock recovery circuits (not shown). As discussed above, the clock recovery circuits can be used to recover clock signals and data from signals received at the I/O terminal(s) CBIO. The clock input/output circuit 133, the internal clock circuit 130, and/or the I/O circuit 160 of the memory device can additionally or alternatively include circuits to superimpose data transmitted over the communication bus 120 with a clock signal. In these and other embodiments, the clock input/output circuit 133, the internal clock circuit 130, and/or the I/O circuit 160 can include circuitry configured to output and/or drive a clock signal over a clock trace connected to the SCK external terminal of the memory device 100.

The memory device 100 may include an array of memory cells, such as memory array 150. The memory cells of the memory array 150 may be arranged in a plurality of memory regions, and each memory region may include a plurality of word lines (WL), a plurality of bit lines (BL), and a plurality of memory cells arranged at intersections of the word lines and the bit lines. In some embodiments, a memory region can be one or more memory banks or another arrangement of memory cells (e.g., half memory banks, subarrays in a memory bank, etc.). In these and other embodiments, the memory regions of the memory array 150 can be arranged in one or more groups (e.g., one or more groups of memory banks, one or more logical memory ranks or dies, etc.). Memory cells in the memory array 150 can include any one of a number of different memory media types, including capacitive, magnetoresistive, ferroelectric, phase change, or the like. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least one respective main I/O line pair (MIOT/B), via transfer gates (TG), which can function as switches. The memory array 150 may also include plate lines and corresponding circuitry for managing their operation.

The command terminals and address terminals may be supplied with an address signal and a bank address signal from outside the memory device 100. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal (BADD) and supply the bank address signal to both the row decoder 140 and the column decoder 145.

The command and address terminals can be supplied with command signals CMD, address signals ADDR, and chip selection signals CS (e.g., from the memory controller 101 and/or the host device 108). The command signals may represent various memory commands (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command (not shown) to the command decoder 115. The command decoder 115 may further include one or more registers 128 for tracking various counts or values.

When a read command is issued, and a row address and a column address are timely supplied with the read command, read data can be read from memory cells in the memory array 150 designated by these row address and column address. The read command may be received by the command decoder 115, which can provide internal commands to the I/O circuit 160 so that read data can be output from the data terminals DQ, RDQS, DBI, and DMI via read/write (RW) amplifiers 155 and the I/O circuit 160 according to the RDQS clock signals. The read data may be provided at a time defined by read latency information RL that can be programmed in the memory device 100, for example, in a mode register (not shown in FIG. 1B). The read latency information RL can be defined in terms of clock cycles of the CK clock signal. For example, the read latency information RL can be a number of clock cycles of the CK signal after the read command is received by the memory device 100 when the associated read data is provided.

When a write command is issued, and a row address and a column address are timely supplied with the command, write data can be supplied to the data terminals DQ, DBI, and DMI according to the WCK and WCKF clock signals. The write command may be received by the command decoder 115, which can provide internal commands to the I/O circuit 160 so that the write data can be received by data receivers in the I/O circuit 160, and supplied via the I/O circuit 160 and the RW amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (not shown in FIG. 1B). The write latency WL information can be defined in terms of clock cycles of the CK clock signal. For example, the write latency information WL can be a number of clock cycles of the CK signal after the write command is received by the memory device 100 when the associated write data is received.

As discussed in greater detail below, the memory device 100 can additionally or alternatively send and/or receive data to/from the memory controller 101 and/or another memory device 100 via the I/O terminal(s) CBIO and the communications bus 120 (FIG. 1A). For example, the memory device 100 can transmit data stored in the memory array 150 and/or at other locations within the memory device 100 (e.g., within the registers 118 of the command decoder 115 or a fuse array (not shown)) to the memory controller 101 and/or another memory device 100 via the I/O terminal(s) CBIO and the communications bus 120. In these and other embodiments, the memory device 100 can receive data from the memory controller 101 and/or another memory device 100 via the communications bus 120 and the I/O terminal(s) CBIO. In turn, the memory device 100 can process and/or store the received data. In these and still other embodiments, the memory device 100 can request (and subsequently receive) specific data from the memory controller 101 and/or another memory device 100 via the communications bus 120 and the I/O terminal(s) CBIO. In some embodiments, communications over the I/O terminal(s) CBIO and the communications bus 120 can be performed as background operations of the memory device 100. Thus, in these embodiments, system bandwidth on the DQ bus 119 (FIG. 1A) and over the data terminals DQ, RDQS, DBI, and DMI can be unaffected or unhindered by communications over the I/O terminal(s) CBIO and the communications bus 120. In some embodiments, the overall bandwidth of the memory system 190 of FIG. 1A can be increased (i) when additional data is transmitted between the memory devices 100 and the memory controller 101 via the communications bus 120, and/or (ii) when the memory device 100 or the memory controller 101 use the communications bus 120 to communicate instead of using the mode registers of the memory device 100.

Figure 2:
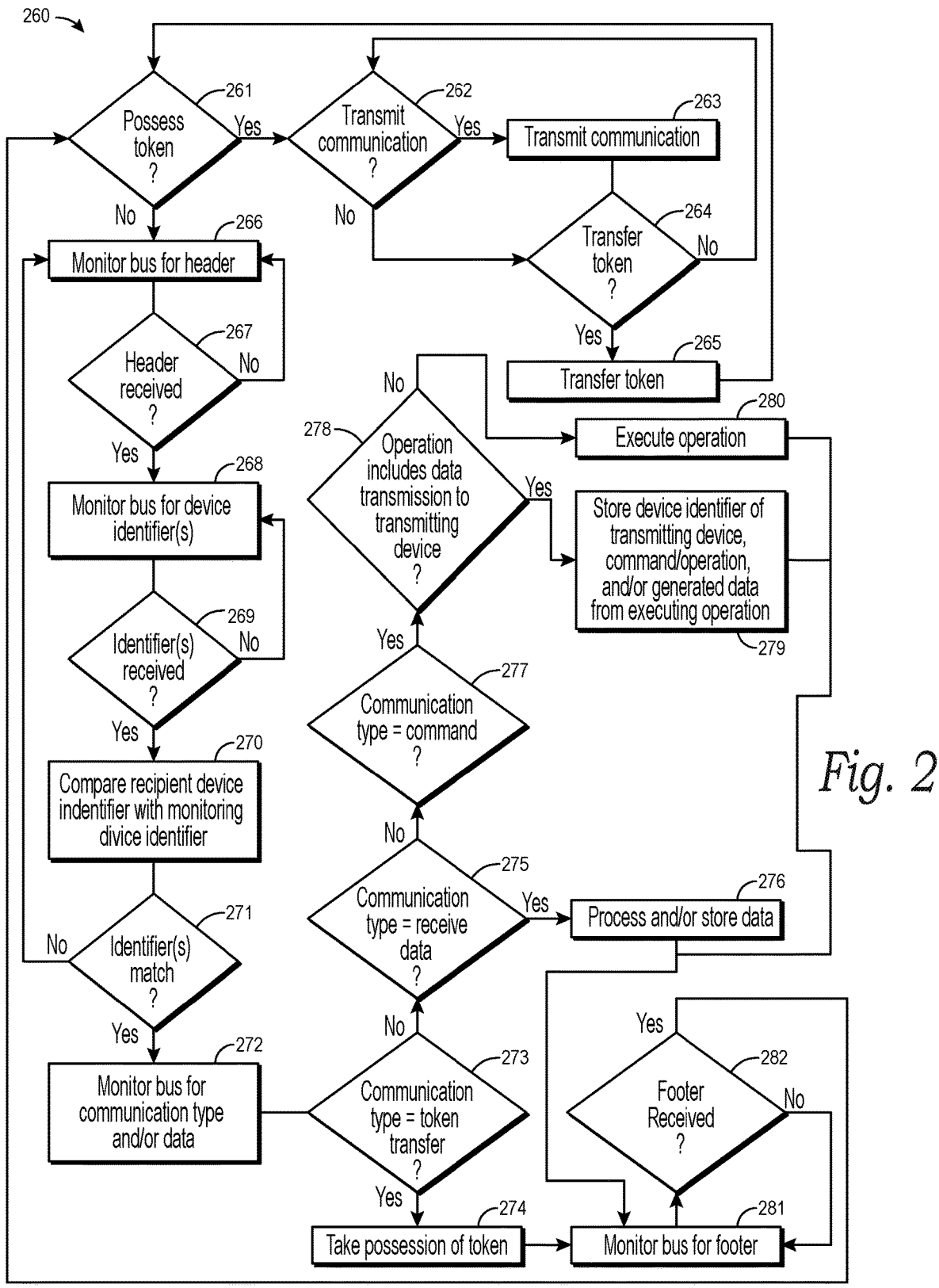
FIG. 2 is a flow diagram illustrating a routine for communicating over a communications bus in accordance with various embodiments of the present technology.

FIG. 2 is a flow diagram illustrating a routine 260 for communicating over a communications bus (e.g., over the communications bus 120 of FIG. 1A) in accordance with various embodiments of the present technology. The routine 260 is illustrated as a set of steps or blocks 261-282. All or a subset of one or more of the blocks 261-282 can be executed by components or devices of a memory system, such as the memory system 190 of FIG. 1A. For example, all or a subset of one or more of the blocks 261-282 can be executed by (i) a memory device (e.g., a memory device 100 of Figures 1A and 1B) and/or (ii) a memory controller (e.g., the memory controller 101 of FIG. 1A).

The routine 260 begins at block 261 by a device determining whether it currently possesses a communication token ("the token"). Possession of the token can indicate control over communications transmitted over the communications bus. Stated another way, in some embodiments, only the device that currently possesses the token can transmit communications over the communications bus. The device can be a memory device of the memory system. In these and other embodiments, the device can be a memory controller of the memory system. In other embodiments, only memory devices (e.g., not the memory controller) of the memory system can possess the token such that communication on the communications bus is reserved for memory device-to-memory controller and/or memory device-to-memory device communications.

In some embodiments, a device can possess the token by default. For example, when the memory system powers on, a specific memory device or a memory controller of the memory system can possess the token by default. In other embodiments, a last device to possess the token when the memory system was powered down can possess the token when the memory system is subsequently powered on. If the device determines at block 261 that it does not currently possess the token, the routine 260 proceeds to block 266. When the routine 260 proceeds to block 266, the device enters listening mode and becomes a monitoring device. On the other hand, if the device determines that it currently possesses the token, the routine 260 proceeds to block 262. When the device possesses the token, the device controls communication over the communications bus. The device therefore becomes a controlling and/or transmitting device when the routine 260 proceeds to block 262.

At block 262, the controlling device determines whether to transmit a communication (e.g., a signal) over the communications bus. In some embodiments, signals sent over the communications bus can include a transmission of data, a request for data, and/or a command to perform an operation. For example, a device can send a request for data from one or more other devices (e.g., other memory devices and/or a memory controller) operably connected to the communications bus. As another example, a device can send data to the other devices. In these and other embodiments, a device can transfer the token over the communications bus, and/or a device can transmit a clock signal (e.g., superimposed over data and/or other components of the communication) over the communications bus. If the controlling device determines not to transmit a communication over the communications bus, the routine 260 proceeds to block 264. On the other hand, if the controlling device determines to transmit a communication over the communications bus, the routine 260 proceeds to block 263.

At block 263, the controlling device transmits a communication over the communications bus. In some embodiments, a device can send communications over the communications bus in a manner (e.g., with a data structure) identifiable by the other devices operably connected to the communications bus. For example, a communication transmitted over the communications bus can include a header of a preset pattern and/or length of bits. The preset pattern and/or length of bits can identify whether the communication is originating from a memory device or a memory controller. In these and other embodiments, the preset pattern and/or length of bits can identify whether the communication is intended for a memory device or memory controller. In some embodiments, the header can indicate that the communication is a memory device-to-memory device communication, a memory device-to-memory controller communication, and/or a memory controller-to-memory device communication. The header in these embodiments can therefore indicate whether the request is originating from a memory device or a memory controller operably connected to the communications bus and/or whether the communication is intended for a memory device or a memory controller operably connected to the communications bus.

In some embodiments, a communication sent over the communications bus can include a device identifier of the controlling/transmitting device and/or a device identifier of the intended recipient of the communication. For example, each device (e.g., each memory device and/or the memory controller) can have a unique identifier that can be used to indicate the origin of a communication transmitted over the communications bus and/or the intended recipient of a communication transmitted over the communications bus. In some embodiments, the unique identifier of a device can correspond to the device's identifier when the memory system is operating in a per-DRAM addressability (PDA) mode. In other embodiments, the device identifiers can be different from the PDA mode identifiers. In these and other embodiments, the identifiers can be provided to and/or programmed into the devices (e.g., during manufacture, assembly, and/or testing of the memory system).

When a communication sent over the communications bus is a transmission of data from the controlling/transmitting device to another device, the communication can include the unique device identifier of the controlling/transmitting device to indicate to the other devices that the data is coming from that specific device. The communication can additionally or alternatively include the unique device identifier of a recipient device to indicate to the other devices that the data is intended for a device having a device identifier that matches the unique device identifier of the recipient device included in the communication. As another example, when the communication is a request for data, the device identifiers included in the communication can indicate which device is requesting the data and/or which device is intended to respond to the request.

In these and other embodiments, a communication sent over the communications bus can include a communication type identifier. The communication type identifier can indicate that the communication is a transmission of data, a request for data, and/or a response to an earlier request for data received from another device operably connected to the communications bus. In these and other embodiments, the communication type identifier can indicate specific data included within or requested by the communication. In some embodiments, the communication type identifier can indicate that the communication is a token transfer. Additionally, or alternatively, the communication type identifier can indicate that the communication is a command. For example, the communication type identifier can indicate that the communication is a reset token command to reset which device currently possesses the token. As another example, the communication type identifier can identify that the communication is a specific command. Continuing with this example, any one or more of the multi-purpose commands (MPC) and/or other commands commonly implemented in double data rate fifth generation (DDR5) and/or other memory devices can be implemented into the communications protocol of the communications bus (e.g., by assigning each command a unique communication type identifier). Thus, the communication type identifier can be used to indicate that the communication is a specific one of the MPC or other commands.

In these and still other embodiments, the communication can include data intended for one or more of the devices operably connected to the communications bus. Data included in the communication can include any type of information stored, generated, and/or processed by the controlling/transmitting device. For example, in a memory device-to-memory controller communication, a controlling/transmitting memory device can communicate reliability data, alert information, and/or other information (e.g., user data stored in a portion of a memory array of the controlling/transmitting device, information stored in registers or a fuse array of the controlling/transmitting device, etc.). Continuing with this example, the data can be error check and scrub (ECS) data of the controlling/transmitting memory device. More specifically, the controlling/transmitting memory device can communicate the number of times individual memory rows of its memory array have been corrected during ECS mode of the controlling/transmitting memory device. Because the number of corrections performed on a memory row during the ECS mode of the controlling/transmitting memory device can indicate the reliability of the memory row to accurately store and retain data, the number of corrections can be considered reliability data of the memory row, of a memory region containing the memory row, and/or of the controlling/transmitting memory device. In some embodiments, the controlling/transmitting memory device can communicate this information to the memory controller for all or a subset of the memory rows of the memory array.

In another example, such as in a memory device-to-memory controller communication, data transmitted over the communications bus can be row hammer refresh (RHR) or other refresh information. For example, the controlling/transmitting memory device can track a number of times a memory row (e.g., of its memory array) has been activated or refreshed. The controlling/transmitting memory device can communicate either or both of these numbers to the memory controller over the communications bus. Additionally, or alternatively, the controlling/transmitting memory device can compare the number of times the memory row has been activated against a threshold. When the number of times the memory row has been activated meets or exceeds the threshold, the controlling/transmitting memory device can communicate an amount of time the controlling/transmitting memory device will be unavailable to the memory controller such that the controlling/transmitting memory device can perform row hammer refresh operations to service the neighboring memory rows. The amount of time communicated to the memory controller can be dependent on the number of memory rows requiring row hammer refresh operations and/or can otherwise reflect a time the controlling/transmitting memory device anticipates needing to service the memory array. After notifying the memory controller of the amount of time and/or after transferring the token to another device, the controlling/transmitting memory device can become unavailable to the memory controller for a time period corresponding to the communicated amount of time. During that time period, the memory device can service its memory array. Once the time period has elapsed (or sooner), the memory device can again become available to the memory controller.

In still another example, such as in a memory device-to-memory device communication or a memory controller-to-memory device communication, data transmitted over the communications bus can be information intended for storage by a recipient memory device. For example, the controlling/transmitting memory controller can use the communications bus to send data to a recipient memory device in addition to or in lieu of using the DQ bus operably connecting the controlling/transmitting memory controller to the recipient memory device. This can increase the bandwidth of the memory system. In these and other embodiments, a controlling/transmitting memory device can transfer data stored in its memory array to a recipient memory device for storage in the memory array of the recipient memory device. Such capability can facilitate (i) transferring data between memory devices of the memory system without tying up the DQ bus, (ii) backing up data stored to a controlling/transmitting memory device by storing a copy of the data on a recipient memory device, (iii) retiring failing memory regions of the controlling/transmitting memory device by moving data from those memory regions to memory regions of a recipient memory device, and/or (iv) aggregating data within the memory system.

In these and other embodiments, data transmitted over the communications bus can be data previously requested by another device (e.g., over the communications bus). For example, a first controlling/transmitting device (a memory device or a memory controller) can request data from a first recipient device (another memory device and/or the memory controller). When the first recipient device subsequently (e.g., next) possesses the token and thereby becomes a second controlling/transmitting device, the second controlling/transmitting device can transmit the data originally requested by the first controlling/transmitting device to the first controlling/transmitting (now second recipient) device.

In these and other embodiments, a communication transmitted over the communications bus can include a tail or footer. The tail or footer can be a preset pattern and/or length of bits. The preset pattern can indicate an end of a communication transmission over the communications bus.

Communications sent over the communications bus can be transmitted in accordance with a clock signal. For example, a controlling/transmitting device transmitting a communication over the communications bus can superimpose a clock signal onto the various components (e.g., the headers, the device identifiers, the communication type identifiers, the data, the tails or footers, etc.) of the communication. The frequency of the clock signal can be known to the other devices operably connected to the communications bus such that clock recovery circuits of the other devices can recover the clock signal and the various components of the communication when the communication is received over the communications bus. In these and other embodiments, communications can be transmitted over the communications bus in accordance with a clock signal that is not sent over the communications bus, such as a clock signal that is transmitted to each device over a clock trace that is separate from the communications bus. In some embodiments, the clock signal and/or the separate clock trace can be dedicated to establishing the timing for signals transmitted over the communications bus. In these and other embodiments, the controlling/transmitting device or another device (e.g., the memory controller or a specific memory device of the memory system) can drive the clock signal transmitted over the clock trace.

At block 264, the controlling device determines whether to transfer the token to another device operably connected to the communications bus. In some embodiments, the token can be transferred between devices of the memory system in accordance with a clock signal. The clock signal for transferring the token can be separate and/or different from the clock signal used for transmitting (e.g., data) communications over the communications bus. For example, the clock signal used for transferring the token can be slower than the clock signal used for transmitting communications over the communications bus.

A controlling device can determine whether to transfer the token at block 264 by referencing the clock signal used for transferring the token. For example, a period of the clock signal used for transferring the token can be 5 nanoseconds. Continuing with this example, a controlling device can transfer the token to another device after possessing the token for 30 nanoseconds. Thus, the controlling device can determine whether to transfer the token at block 264 by determining whether six cycles of the clock signal have elapsed. If six cycles of the clock signal have not elapsed, the routine 260 can return to block 262 or block 263. On the other hand, if six cycles of the clock signal have elapsed, the routine 260 can proceed to block 265.

In these and other embodiments, a controlling device can determine whether to transfer the token to another device by determining whether the controlling device has finished transmitting communications over the communications bus. If the controlling device has completed transmitting communications over the communications bus, the routine can proceed to block 265 and the controlling device can transfer the token to another device. On the other hand, if the controlling device has not completed transmitting communications over the communications bus, the routine 260 can return to block 262 or block 263.

Additionally, or alternatively, a controlling device can determine whether to transfer the token to another device based on a previous communication sent over the communications bus. For example, at block 263, the controlling/transmitting device can transmit a communication requesting data from a recipient device. After transmitting the request for data (e.g., immediately after and/or when the controlling/transmitting device is finished transmitting requests over the communications bus), the controlling device can determine at block 264 to transfer the token to the recipient device for the recipient device to respond to the request for data. (After the recipient device finishes responding to the request for data and/or finishes transmitting other communications, the recipient device can return the token to the controlling/transmitting device that originally requested the data, or the recipient device can transfer the token to a different device of the memory system, such as a next device in a predetermined sequence.)

In these and still other embodiments, a controlling device can determine whether to transfer the token to another device by determining whether it has received a reset token command. For example, a memory controller can issue a reset token command over the CMD/ADDR bus, the DQ bus, and/or the communications bus. In some embodiments, the reset token command can be accompanied by a device identifier indicating which of the memory devices is to take possession of the token. Additionally, or alternatively, a memory device of the memory system can be configured to take possession of the token by default whenever a reset token command is issued. A memory controller can be configured to issue the reset token command upon powerup of the memory system. In other embodiments, the memory controller can issue the reset token command when the memory controller wants to communicate (e.g., send data to and/or receive data from) a specific memory device. In these embodiments, the device identifier accompanying the reset token command can identify the specific memory device to next take possession of the token.

In response to a reset token command, a controlling device currently possessing the token can abort or cut short transmitting communications over the communication line at block 263, release possession of the token, and/or determine at block 264 to transfer the token (e.g., to the device corresponding to the device identifier accompanying the reset token command). Thus, blocks 263 and 264 of the routine 260 can, at least in part, be performed simultaneously in some embodiments.

At block 265, the controlling device transfers the token to another device operably connected to the communications bus. In some embodiments, the communications bus can be reserved for only communications between a memory device and a memory controller and/or a memory device and another of the memory devices. Thus, in these embodiments, the memory controller cannot possess the token and/or only memory devices can possess the token. In these and other embodiments, the memory controller can be included in the token ring such that the memory controller can possess the token.

In some embodiments, the token can be transferred in accordance with a specific and/or preset order. For example, the token can be transferred in a round robin fashion such that a first device transfers (e.g., always transfers, transfers by default, etc.) the token to a second device. In these and other embodiments, a controlling device can transfer the token to a specific device. For example, a controlling device can transfer the token to a specific device after the controlling device requested data from that specific device.

As discussed above, to transfer the token, a controlling device can transmit a header, a recipient device identifier, a transfer token communication type, an end or tail, and/or other information (e.g., a transmitting device identifier). The recipient device identifier can indicate the specific device to take possession of the token. In these and other embodiments, the controlling device can give up possession of the token without transferring the token to a specific device over the communications bus, such as in response to the controlling device receiving a reset token command. After transferring the token, the routine 260 can return to block 261.

Referring again to block 261, if a device determines that it does not currently possess the token, the routine 260 proceeds to block 266. If a device does not possess the token, the device enters listening mode and monitors communications transmitted over the communications bus. In other words, the device is a monitoring device. In some embodiments, monitoring communications sent over the communications bus includes recovering (e.g., using one or more clock recovery circuits) a clock signal and data from signals received over the communications bus. In these and other embodiments, monitoring communications sent over the communications bus includes referencing a clock signal associated with the communications bus and/or received over a clock trace separate from the communications bus.

At block 266, a device monitors the communications bus for signals that include a header of a present pattern and/or length of interest. As discussed above, the header of a communication transmitted over the communications can indicate whether the communication is a communication intended for a memory device or a memory controller. Thus, in embodiments in which the monitoring device is a memory device, the monitoring device can monitor the communications bus for a header having a preset pattern and/or length that indicates that a communication is a memory device-to-memory device or a memory controller-to-memory device communication. Similarly, in embodiments in which the monitoring device is a memory controller, the monitoring device can monitor the communications bus for a header having a preset pattern and/or length that indicates that a communication is a memory device-to-memory controller communication (or a memory controller-to-memory controller communication in embodiments including multiple memory controllers operably connected to the communications bus).

At block 267, the monitoring device determines whether a header received over the communications bus includes a preset pattern and/or length of interest. If the header received over the communications bus does not include a preset pattern and/or length of interest, the routine 260 returns to block 266. On the other hand, if the header received over the communications bus includes a preset pattern and/or length of interest, the routine 260 proceeds to block 268.

At block 268, the monitoring device monitors the communications bus for a recipient device identifier and/or for a controlling/transmitting device identifier. As discussed above, the recipient device identifier can indicate the device for which the communication is intended. The controlling/transmitting device identifier can indicate which device currently has possession of the token and/or is transmitting the communication over the communications bus.

At block 269, the monitoring device determines whether the recipient device identifier and/or the controlling/transmitting device identifier have been received. If the monitoring device determines that the recipient and/or transmitting device identifiers have not been received, the routine 260 returns to block 268. On the other hand, if the monitoring device is a memory device and the monitoring device determines the recipient and/or transmitting devices identifiers have been received, the routine 260 continues to block 270. In embodiments in which the monitoring device is a memory controller and only one memory controller is operably connected to the communications bus, a recipient device identifier is not needed when the header indicates that the communication is intended for the memory controller. In these embodiments, if the monitoring device determines that a transmitting device identifier has been received, the routine 260 can proceed to block 272.

At block 270, the monitoring device compares the recipient device identifier to the device identifier of the monitoring device. As discussed above, each device (e.g., each memory device and/or the memory controller) can include a unique device identifier. Thus, when the recipient identifier matches the unique identifier of the monitoring device, the monitoring device can determine that the communication is intended for that device (e.g., as opposed to the other devices of the memory system).

At block 271, the monitoring device determines whether the recipient device identifier matches the device identifier of the monitoring device. If the monitoring device determines that the recipient device identifier does not match the device identifier of the monitoring device, the routine 260 can return to block 266. On the other hand, if the monitoring device determines that the recipient device identifier matches the device identifier of the monitoring device, the routine 260 can proceed to block 272.

At block 272, the monitoring/recipient device monitors the communication bus for a communication type identifier and/or other data transmitted to the monitoring device from the transmitting device. As discussed above, the communication type identifier can indicate whether the communication is a token transfer to the monitoring/recipient device, is a data transfer from the transmitting device to the monitoring/recipient device, is a request for data from the monitoring/recipient device, and/or is a command for the monitoring/recipient device to perform a specific operation. The communication type identifier can additionally or alternatively indicate the type of data (e.g., ECS data, RHR data, alert-type information, user data, etc.) included in the communication. The routine 260 can proceed to block 273 when the monitoring/recipient device receives the communication type identifier and/or other data over the communications bus.

At block 273, the monitoring/recipient device determines whether the communication is a token transfer. If the monitoring/recipient device determines the communication is a token transfer, the routine 260 proceeds to block 274 at which the monitoring/recipient takes possession of the token. The routine 260 can then proceed to block 281. On the other hand, if the monitoring/recipient device at block 273 determines the communication is not a token transfer, the routine proceeds to block 275.

At block 275, the monitoring/recipient device determines whether the transmitting device is sending the monitoring/recipient device data (e.g., reliability information, alert-type information, refresh data, user data, etc.). If the monitoring/recipient device determines that the transmitting device is sending the monitoring/recipient device data, the routine 260 proceeds to block 276 at which the monitoring/recipient device processes and/or stores the data received from the transmitting device over the communications bus. The routine 260 can then proceed to block 281. On the other hand, if the monitoring/recipient device at block 275 determines the transmitting device is not sending the monitoring/recipient device data, the routine proceeds to block 277.

At block 277, by the monitoring/recipient device determines whether the communication is a command for the monitoring/recipient device to perform an operation. If the monitoring/recipient device determines that the communication is a command for the monitoring/recipient to perform an operation, the routine 260 proceeds to block 278.

At block 278, the monitoring/recipient device determines whether executing the operation includes a data transfer from the monitoring/recipient device to the transmitting device. For example, when the communication is a command to transfer data from the monitoring/recipient device to the transmitting device, the monitoring/recipient device can determine at block 278 that executing the operation involves a data transfer from the monitoring/recipient device to the transmitting device. If the monitoring/recipient device determines that performing the operation includes a data transfer from the monitoring/recipient device to the transmitting device, the routine 260 can proceed to block 279 at which the monitoring/recipient device can store (i) the device identifier of the transmitting device, (ii) the command and/or operation of the communication received over the communications bus, and/or (iii) data generated by executing (in whole or in part) the operation. As discussed above, when the monitoring/recipient (e.g., next) controls the token, the monitoring/recipient device can transfer data to the transmitting device by referencing one or more of these stored pieces of information. The routine 260 can then proceed to block 281.

Returning again to block 278, if the monitoring/recipient device determines that executing the operation does not include a data transfer from the monitoring/recipient device to the transmitting device, the routine 260 can proceed to block 280 at which the monitoring/recipient executes the operation. The routine 260 can then proceed to block 281.

At block 281, the monitoring/recipient device monitors the communications bus for a tail or footer of the communication. As discussed above, the tail or footer can be a preset pattern and/or length of bits, which can indicate an end of a communication transmitted over the communications bus. At block 282, the monitoring/recipient device determines whether a tail or footer has been received over the communications bus. If the monitoring/recipient device determines that a tail or footer has not been received, the routine 260 can return to block 272 (e.g., to receive further information and/or commands from the transmitting device) or to block 281. If the monitoring/recipient device determines at block 282 that a tail or footer has been received, the routine 260 can return to block 261.

Although the blocks 261-282 of the routine 260 are discussed and illustrated in a particular order, the routine 260 illustrated in FIG. 2 is not so limited. In other embodiments, the routine 260 can be performed in a different order. In these and other embodiments, any of the blocks 261-282 of the routine 260 can be performed before, during, and/or after any of the other blocks 261-282 of the routine 260. For example, blocks 273-274 and/or blocks 275-276 can be performed before, during, and/or after blocks 277-279 and/or blocks 277/278/280 of the routine 260. Moreover, a person of ordinary skill in the relevant art will recognize that the illustrated routine 260 can be altered and still remain within these and other embodiments of the present technology. For example, one or more blocks 261-282 of the routine 260 illustrated in FIG. 2 can be omitted and/or repeated in some embodiments.

Figure 3:
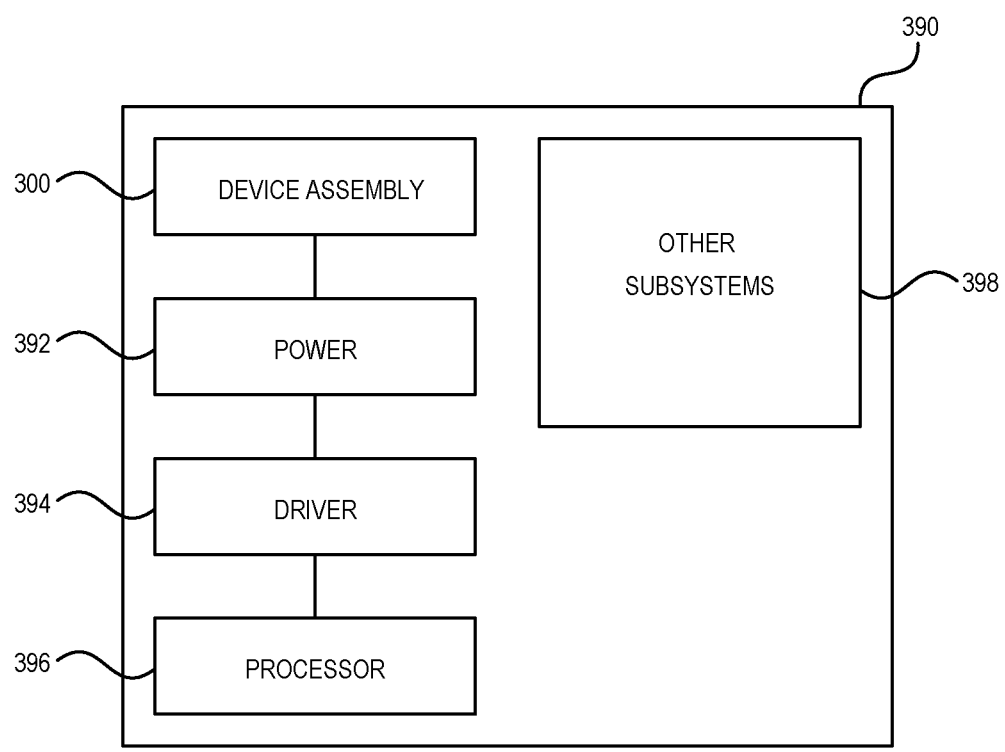
FIG. 3 is a schematic view of a system that includes a memory device or system configured in accordance with various embodiments of the present technology.

Any of the foregoing memory systems, devices, and/or methods described above with reference to FIGS. 1A-2 can be incorporated into any of a myriad of larger and/or more complex systems, a representative example of which is system 390 shown schematically in FIG. 3. The system 390 can include a semiconductor device assembly 300, a power source 392, a driver 394, a processor 396, and/or other subsystems and components 398. The semiconductor device assembly 300 can include features generally similar to those of the memory systems, devices, and/or methods described above with reference to FIGS. 1A-2. The resulting system 390 can perform any of a wide variety of functions, such as memory storage, data processing, and/or other suitable functions. Accordingly, representative systems 390 can include, without limitation, hand-held devices (e.g., mobile phones, tablets, digital readers, and digital audio players), computers, vehicles, appliances, and other products. Components of the system 390 may be housed in a single unit or distributed over multiple, interconnected units (e.g., through a communications network). The components of the system 390 can also include remote devices and any of a wide variety of computer readable media.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms can also include the plural or singular term, respectively. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded.

From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A memory device, comprising:
   an input/output terminal configured to be operably connected to a memory controller,
   wherein:
      the input/output terminal is separate from data terminals of the memory device,
      the memory device is configured to initiate a communication with the memory controller by outputting a signal via the input/output terminal, and
      the memory device is configured to output the signal via the input/output terminal in accordance with a first clock signal that is different from a second clock signal used to output or receive data signals via the data terminals.

2. The memory device of claim 1, wherein:
   the memory device further comprises a clock terminal; and
   the memory device is configured to drive or receive the first clock signal via the clock terminal.

3. The memory device of claim 1, wherein the memory device is further configured to superimpose the first clock signal over information included in the signal such that the first clock signal and the information is output via the input/output terminal when the signal is output via the input/output terminal.

4. The memory device of claim 1, wherein:
   the communication is a first communication and the signal is a first signal;
   the input/output terminal is further configured to be operably connected to another memory device; and
   the memory device is further configured to initiate a second communication with the other memory device by outputting a second signal via the input/output terminal.

5. The memory device of claim 4, wherein the second communication includes a transfer of a communication token, a transmission of first data, or a request for second data.

6. The memory device of claim 1, wherein the communication is a transmission of first data to or a request for second data from the memory controller.

7. The memory device of claim 1, wherein:
   the communication is a transmission of data to the memory controller;
   the data included in the signal comprises error check and scrub data or refresh data; and
   the refresh data includes a time the memory device will be unavailable to the memory controller to perform row hammer refresh servicing on one or more memory regions of the memory device.

8. The memory device of claim 1, wherein the memory device is further configured to initiate the communication with the memory controller only when the memory device possesses a communication token.

9. The memory device of claim 1, wherein the signal indicates (i) an intended recipient of the signal, (ii) an identifier of the memory device, and (iii) an identification of information included in the signal.

10. The memory device of claim 1, wherein the memory device is further configured to initiate the communication as a background operation of the memory device.

11. A method of operating a memory device, the method comprising:
   determining that the memory device possesses a communication token;
   in response to determining that the memory device possesses the communications token, initiating a communication with a memory controller operably connected to an input/output terminal of the memory device via a communications bus,
   wherein initiating the communication includes outputting a signal to the memory controller via the input/output terminal and the communications bus and only when the memory device possesses the communication token.

12. The method of claim 11, further comprising:
   receiving or driving a clock signal via a clock terminal of the memory device, wherein signals transmitted over the communications bus are transmitted in accordance with the clock signal; or
   superimposing the clock signal over information included in the signal such that the clock signal and the information are output via the input/output terminal when the signal is output via the input/output terminal.

13. The method of claim 11, wherein:
   the communication is a transmission of data from the memory device to the memory controller; and
   the data includes refresh data indicating an amount of time the memory device will be unavailable to the memory controller during which the memory device will perform row hammer refresh servicing on memory regions of the memory device.

14. The method of claim 11, wherein the communication is a request for data from the memory controller.

15. The method of claim 11, wherein:
the memory device is a first memory device, the communication is a first communication, and the signal is a first signal;
the method further comprises, in response to determining that the first memory device possesses the communications token, initiating a second communication with a second memory device operably connected to the input/output terminal of the first memory device via the communications bus,
wherein:
  initiating the second communication includes outputting a second signal to the second memory device via the input/output terminal and the communications bus; and
  the second communication is a transfer of the communications token from the first memory device to the second memory device.

16. The method of claim 11, wherein:
the signal output via the input/output terminal is a first signal;
the method further comprises, in response to determining the memory device does not possess the communications token, monitoring signals received over the communications bus for a second signal of a second communication; and
the second signal indicates that the second communication is intended for the memory device.

17. The method of claim 16, wherein:
the second communication is a transfer of the communications token to the memory device; and
the method further comprises, in response to receiving the second signal, taking possession of the communications token.

18. A memory system, comprising:
a memory controller;
a memory device having data terminals and an input/output terminal separate from the data terminals; and
a communications bus operably connecting the input/output terminal of the memory device to the memory controller,
wherein:
  the memory device is configured to initiate a communication with the memory controller by transmitting a signal to the memory controller via the input/output terminal and the communications bus; and
  the memory device is configured to transmit the signal in accordance with a first clock signal that is different from a second clock signal used to transmit or receive data signals via the data terminals of the memory device.

19. The memory system of claim 18, wherein:
the memory device is a first memory device and the input/output terminal is a first input/output terminal;
the memory system further comprises a second memory device having a second input/output terminal;
the communications bus further operably connects (a) the second input/output terminal to the memory controller, and (b) the second input/output terminal to the first input/output terminal;
the first memory device and the second memory device are configured to transfer a communications token to one another; and
the first memory device is configured to initiate the communication with the memory controller only when the first memory device possesses the communications token.

20. The memory system of claim 18, wherein:
the memory device is a first memory device and further includes a first clock terminal;
the memory system further comprises:
  a second memory device having a second clock terminal, and
  a clock trace operably connecting the first clock terminal and the second clock terminal to the memory controller; and
the first memory device is configured to receive or drive the first clock signal via the first clock terminal.

* * * * *